United States Patent
Xiao

(10) Patent No.: US 11,618,087 B2
(45) Date of Patent: Apr. 4, 2023

(54) ADDITIVE MANUFACTURING PRINTHEAD WITH ANNULAR AND REFRACTORY METAL RECEPTOR TUBE

(71) Applicant: MICROCVD CORPORATION, Dayton, OH (US)

(72) Inventor: Zhigang Xiao, Dayton, OH (US)

(73) Assignee: MICROCVD CORPORATION, Dayton, OH (US)

(*) Notice: Subject to any disclaimer, the term of this patent is extended or adjusted under 35 U.S.C. 154(b) by 0 days.

(21) Appl. No.: 17/171,422

(22) Filed: Feb. 9, 2021

(65) Prior Publication Data

US 2021/0245438 A1    Aug. 12, 2021

Related U.S. Application Data

(60) Provisional application No. 62/975,237, filed on Feb. 12, 2020.

(51) Int. Cl.

| | |
|---|---|
| *B22F 12/70* | (2021.01) |
| *B33Y 40/00* | (2020.01) |
| *B33Y 10/00* | (2015.01) |
| *B33Y 30/00* | (2015.01) |
| *B22F 10/25* | (2021.01) |
| *B22F 12/53* | (2021.01) |

(52) U.S. Cl.
CPC .............. *B22F 12/70* (2021.01); *B22F 10/25* (2021.01); *B22F 12/53* (2021.01); *B33Y 10/00* (2014.12); *B33Y 30/00* (2014.12); *B33Y 40/00* (2014.12)

(58) Field of Classification Search
CPC .......... B22F 12/70; B22F 10/25; B22F 12/53; B22F 12/41; B22F 12/47; B33Y 10/00; B33Y 30/00; B33Y 40/00; Y02P 10/25
See application file for complete search history.

(56) References Cited

U.S. PATENT DOCUMENTS

| | | | |
|---|---|---|---|
| 2011/0188635 A1* | 8/2011 | Cho ...................... | H01J 35/066 977/939 |
| 2016/0194233 A1* | 7/2016 | Van Pelt ................. | C03B 19/00 65/32.4 |
| 2018/0281284 A1* | 10/2018 | Elgar .................... | B29C 64/176 |

OTHER PUBLICATIONS

Michaelis, B. Matthew et al.; "In-flight thermal control of molten metal droplet streams"; International Journal of Heat and Mass Transfer; 2007.

(Continued)

*Primary Examiner* — Joseph S Del Sole
*Assistant Examiner* — Guy F Mongelli
(74) *Attorney, Agent, or Firm* — Thomas E. Lees, LLC

(57) ABSTRACT

A printhead for heating metals with a high melting point comprises a cap with a metal-material inlet and a pressurized-gas inlet. A material manifold holds metal material fed through the metal-material inlet and is surrounded by a material manifold shield. A nozzle is coupled to the material manifold, and a refractory metal receptor tube surrounds the nozzle. An annular filament surrounds the receptor tube and defines an electron beam zone at the receptor tube to melt the metal material in the manifold. As the metal material is fed to the nozzle, it melts and a shield-gas manifold coupled to a shield-gas inlet supplies a shield gas to the material as the melted material exits the nozzle. With the shielding and materials used to construct the various parts of the printhead, metal feedstock with a melting point up to 3,000° C. may be used in additive manufacturing systems and processes.

18 Claims, 4 Drawing Sheets

(56) References Cited

OTHER PUBLICATIONS

Tesař, Václav; "Fluid mechanics of additive manufacturing of metal objects by accretion of drops—a survey"; EDP Sciences; 2016.
Tesař, Václav et al.; "Fluid Mechanics of Molten Metal Droplets in Additive Manufacturing"; International Journal Comp. Meth, and Exp Meas., vol. 4, No. 4; 2016.
Vader, Scott et al.; "Magnetohydrodynamic Liquid Metal Jet Printing"; Advanced Manufacturing, Electronics and Microsystems: TechConnect Briefs; 2015.
Zamora, R. et al.; Development of a facility for molten metal micro-droplets generation. Application to microfabrication by deposition; The Manufacturing Engineering Society International Conference, MESIC; 2015.
Zenou, M. et al.; "Laser jetting of femto-liter metal droplets for high resolution 3D printed structures"; Scientific Reports; 2015.
Sukhotskiy, V. et al.; "Magnetohydrodynamic Drop-on-Demand Liquid Metal 3D Printing"; Solid Freeform Fabrication 2017: Proceedings of the 28 Annual International Solid Freeform Fabrication Symposium—An Additive Manufacturing Conference; 2017.

* cited by examiner

ADDITIVE MANUFACTURING PRINTHEAD WITH ANNULAR AND REFRACTORY METAL RECEPTOR TUBE

CROSS REFERENCE TO RELATED APPLICATIONS

This application claims the benefit of U.S. Provisional Patent Application Ser. No. 62/975,237, filed Feb. 12, 2020, entitled "DROP-ON-DEMAND ADDITIVE MANUFACTURING PRINTHEAD", the disclosure of which is hereby incorporated by reference.

BACKGROUND

Various aspects of the present invention relate generally to additive manufacturing, and in particular to drop-on-demand additive manufacturing.

Additive manufacturing adds material in successive layers to build 3D objects. Most metal additive manufacturing processes use laser or electron beams to melt high-quality metal feedstock in shielding gas chambers or under high vacuum to produce small droplets for deposition.

Drop-on-demand additive manufacturing promises advantages over other additive manufacturing methods. For example, drop-on-demand can be used to print small droplets, large droplets, and liquid streams. Further, drop-on-demand printheads can move in six orientations relative to the fabricated part, which reduces supporting material requirements during fabrication and post treatment. As another example, drop-on-demand can produce more dense structures than other additive manufacturing methods based on laser or electron beam heating sources, because the droplet or stream goes from a liquid state in the print head nozzle to solid on the fabricated part as opposed to metal feedstock melting at the fabricated part and transforming back to a solid. Moreover, drop-on-demand can reduce large 3D part manufacturing time by first printing a peripheral structure using small droplets and then filling a resultant cavity with large printing drops or streams. Also, drop-on-demand can utilize less costly feedstock materials in terms of morphology and particle size.

BRIEF SUMMARY

According to aspects of the present invention, a printhead for heating metals with a high melting point comprises a cap with a metal-material inlet and a pressurized-gas inlet. A material manifold holds metal material fed through the metal-material inlet and is surrounded by a material manifold shield. A nozzle is coupled to the material manifold, and a refractory metal receptor tube surrounds the nozzle. An annular filament surrounds the receptor tube and defines an electron beam zone at the receptor tube to melt the metal material in the manifold. As the metal material is fed to the nozzle, it melts and a shield-gas manifold coupled to a shield-gas inlet supplies a shield gas to the material as the melted material exits the nozzle. With the shielding and materials used to construct the various parts of the printhead, metal feedstock with a melting point up to 3,000° C. may be used in additive manufacturing systems and processes.

DETAILED DESCRIPTION

According to various aspects of the present disclosure, a drop-on-demand printhead for high melting-point metals includes a refractory metal (e.g., molybdenum, uranium, tungsten, etc.) shield to allow for metal feedstock of higher melting points than in traditional drop-on-demand printheads. For example, the printheads described herein may be used to melt high temperature titanium alloys, nickel super alloys, some refractory metals, other metals with a melting temperature below tungsten, ceramics, etc. Further, there are no tight requirements for feedstock material size or shape, and the feedstock materials can be easily changed to fabricate composite material parts.

Figure 1:
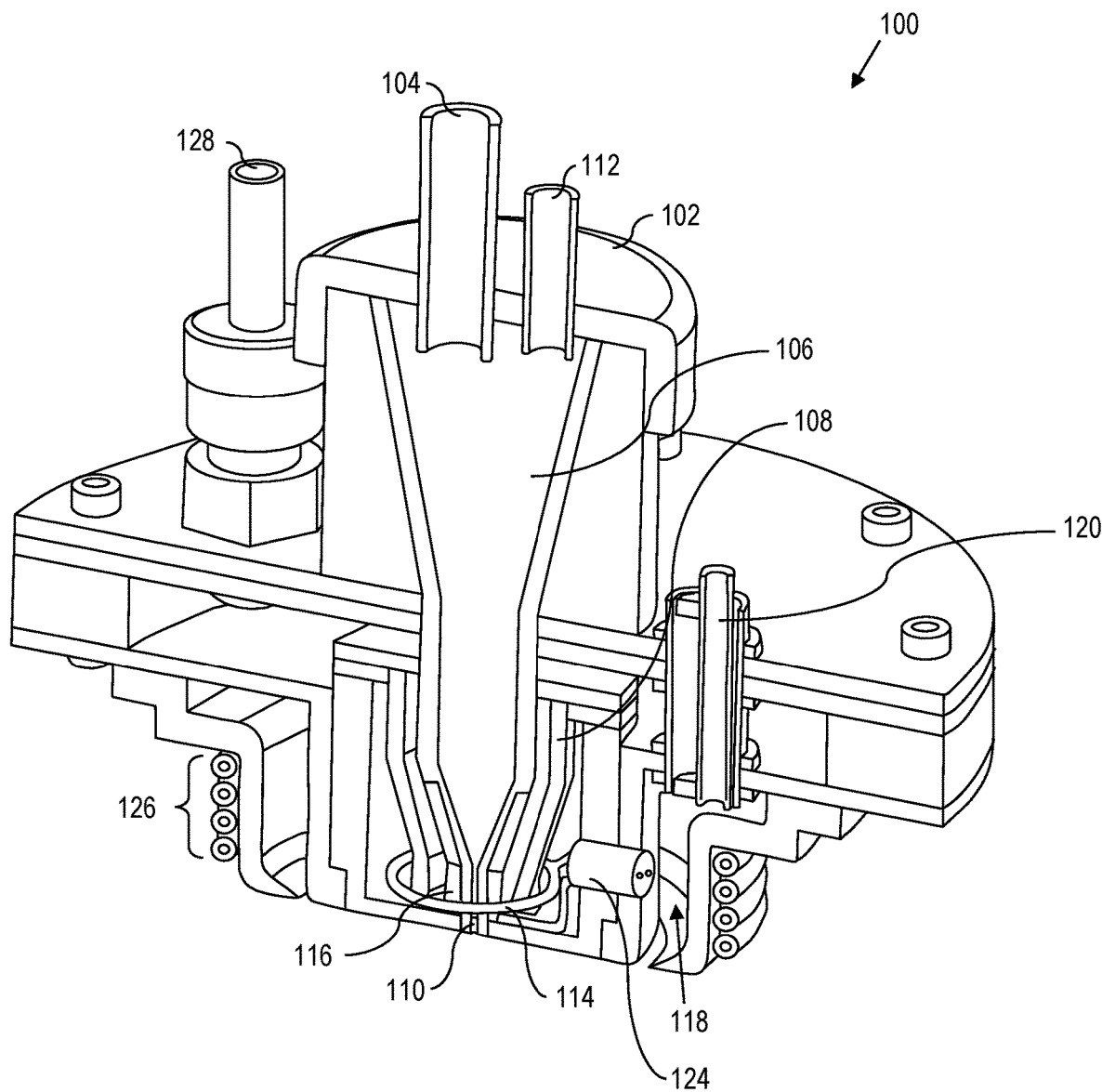
FIG. 1 is a diagram illustrating a printhead for high-melting-point metals, according to various aspects of the present disclosure.

FIG. 1 illustrates a printhead 100 including a cap 102 that has a metal-material inlet (i.e., metal feedstock inlet) 104 that allows for metal feedstock to enter the printhead 100. The cap may be made of any material (e.g., stainless steel, refractory metals, etc.).

Once in the printhead 100, the metal material resides in a material manifold 106, which is at least partially surrounded by a material manifold shield 108 that is made of a refractory metal. The material manifold 106 may comprise refractory materials, ceramic, etc. Moreover, the printhead 100 includes a nozzle 110 opposite the cap 102 for melted metal material to exit the printhead 100 for constructing a desired part. Similar to the material manifold, the nozzle may be ceramic, refractory materials, etc. Pressurized gas (e.g., argon, etc.) enters the material manifold 104 through a pressurized gas inlet 112 to force the metal material in the manifold 106 to the nozzle 110.

An annular filament 114 surrounds both the nozzle 110 and a receptor tube 116 made from a refractory metal (e.g., tungsten, molybdenum, etc.) that surrounds at least a portion of the nozzle 110. The annular filament 114 defines an electron beam zone at the receptor tube 116 to melt the metal material in the manifold 106, so the melted metal material will flow out the nozzle under the pressure of the pressurized gas. A shield-gas manifold 118 is coupled to a shield-gas inlet 120 to supply a shield gas (e.g., an inert gas such as argon) to ensure that the melted metal material does not oxidize as the melted metal material exits the nozzle 110.

To regulate a rate in which the melted metal material exits the nozzle 110, the pressurized-gas inlet may include a high-frequency valve (not shown). To regulate heat at the receptor tube 116 and nozzle 110, the annular filament 114 is coupled to a direct-current (DC) source (not shown). For example, the annular filament 114 is coupled to a negative terminal of the direct-current source (coupler to the direct current source shown as 124), and the receptor tube 116 is coupled to a positive terminal of the direct-current source (coupler to the direct current source shown as 124). Thus, regulating power from the direct-current source regulates heat at the heating zone, which can be used to regulate the viscosity of the melted metal.

Electron beam generation takes place in the filament 114 (e.g., tungsten) that emits free electrons which are accelerated between the filament 114 and the refractory metal receptor tube 116 under an electrostatic field. The beam, which is shielded and focused by the refractory metal, hits the refractory metal receptor tube 116 which transfers the electron beam power to the metal material manifold and nozzle. The drop-on-demand printhead heating mechanism relies on electron beam bombardment of the refractory metal receptor tube surface and heat transfer to the inner ceramic crucible containing metal feedstock. The electron beam power is proportional to acceleration voltage and beam current. Further, the refractory metal receptor tube should have enough mass to absorb the electron beam power and then transfer the thermal energy to the ceramic materials of the manifold and nozzle.

In some embodiments, the printhead 100 includes a water-circulation tube 126 for circulating water to cool the printhead. Other cooling systems may be used as well. Further, the printhead includes a vacuum inlet 128 that allows a vacuum (approx. $10^{-6}$ torr) to be drawn in the printhead.

Using the printheads described herein, the metal leaving the printhead is in a molten (i.e., melted/liquid state), which then solidifies into a solid outside the printhead. the printed part can be rotated or tilted during fabrication thus requiring less support structures and providing capability to create more complex 3D shapes. Moreover, as opposed to conventional additive manufacturing systems, only the printhead is required to be in a vacuum as opposed to the entire system.

Figure 2:
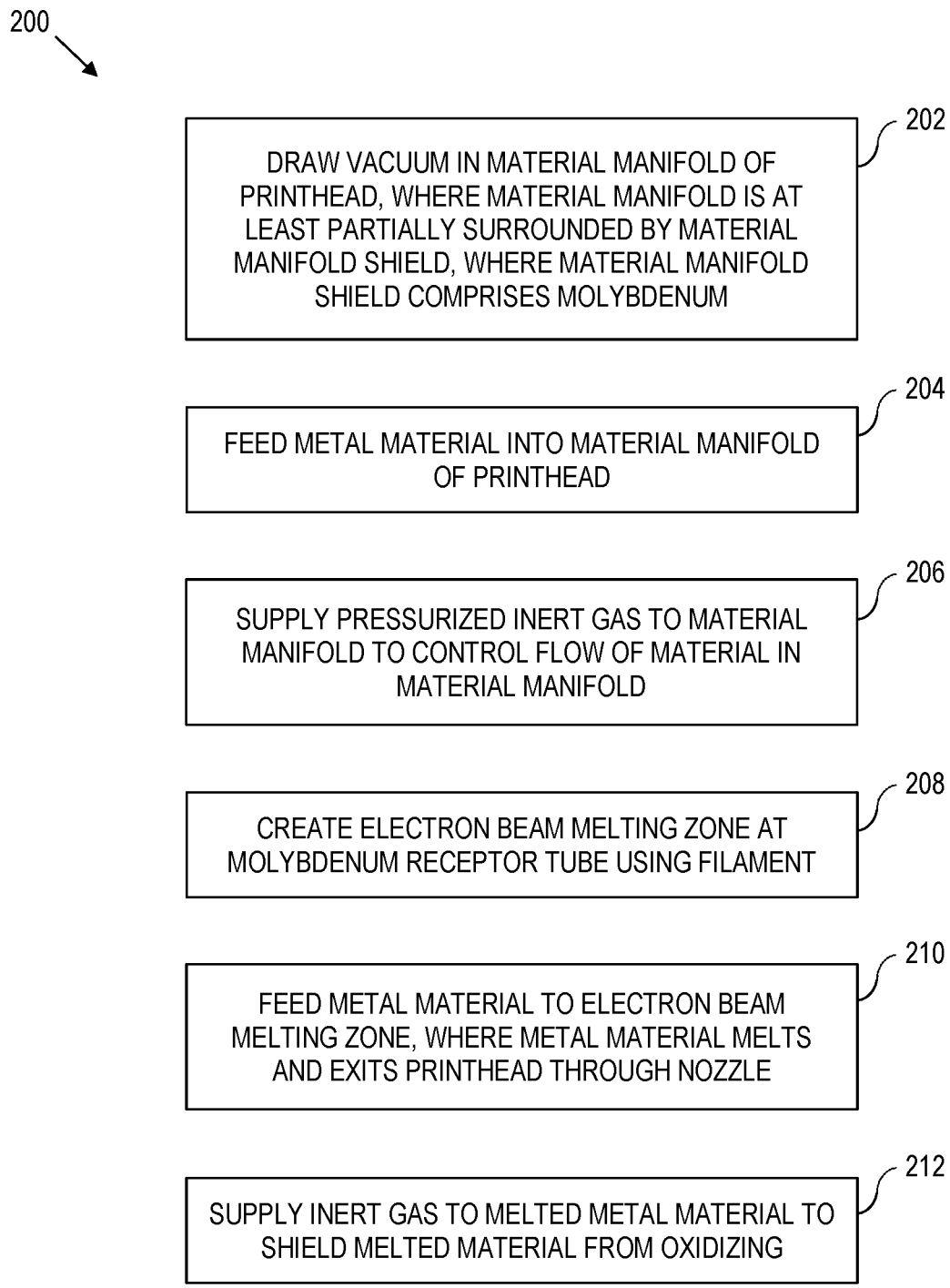
FIG. 2 is a flow chart illustrating a process for additive manufacturing using a printhead for high-melting-point metals, according to various aspects of the present disclosure.

Turning now to FIG. 2, a flow chart for s process 200 for heating metals with a high melting point for additive manufacturing using a drop-on-demand printhead (FIG. 1, 100) as described herein is shown. At 202 a vacuum is drawn in a material manifold of the printhead, where the material manifold is at least partially surrounded by a material manifold shield, where the material manifold shield, as described above. The vacuum may be drawn and then the printhead sealed off, or the vacuum may be maintained with an active vacuum system throughout printing.

At 204, metal material with a high melting point (just below the melting point of tungsten (approx. 3,400 degrees Celsius) or lower) is added into the material manifold of the printhead. At 206, a pressurized inert gas is supplied to the material manifold to control a flow of the metal material in the material manifold. At 208, using an annular filament coupled to a DC source, an electron beam melting zone is created at a receptor tube also coupled to the DC source. At 210, the metal material is fed to a portion of the printhead heated by the electron beam melting zone using the pressurized inert gas, and the metal material melts and exits the printhead through a nozzle associated with the melting zone. At 212, an inert shield gas is supplied around the nozzle to the melted material to prevent the melted material from oxidizing. The printhead can then be controlled to fabricate a desired part.

Figure 3:
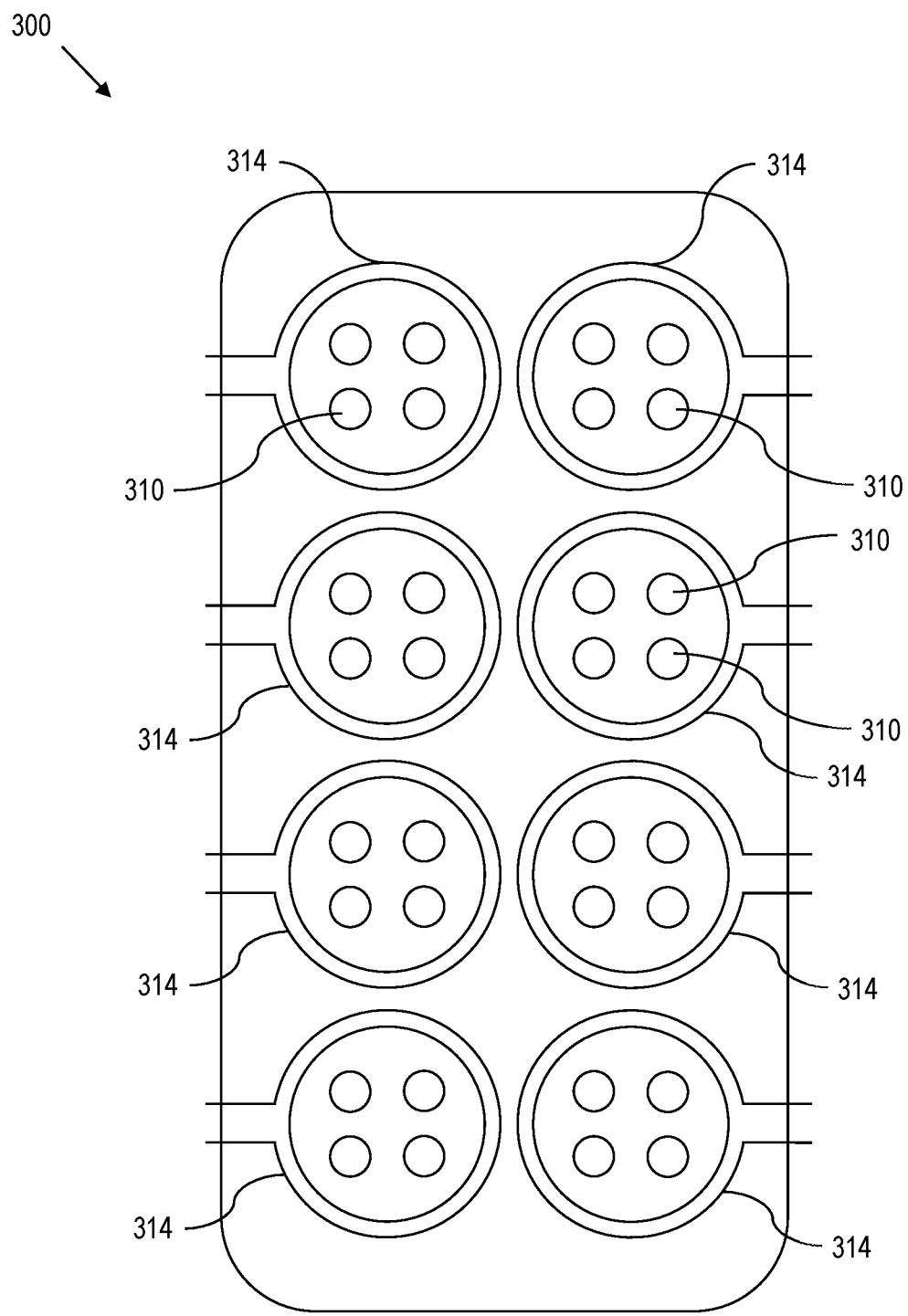
FIG. 3 is a diagram illustrating multiple printheads for high-melting-point metals on a single substrate, according to various aspects of the present disclosure.

FIG. 3 illustrates a printhead 300 with several filaments 314 to each heat several nozzles 110. As shown in FIG. 3, there are eight annular filaments 314, each heating four nozzles 310. However, any number of annular filaments may be used, and each filament may be associated with any number of nozzles. Further, the number of nozzles associated with a filament does not need to be uniform. For example, one annular filament can heat two nozzles while a second annular filament can heat three nozzles. A printhead 300 with several nozzles and filaments as shown in FIG. 3 improves fabrication productivity, because each filament can be controlled independently.

Figure 4:
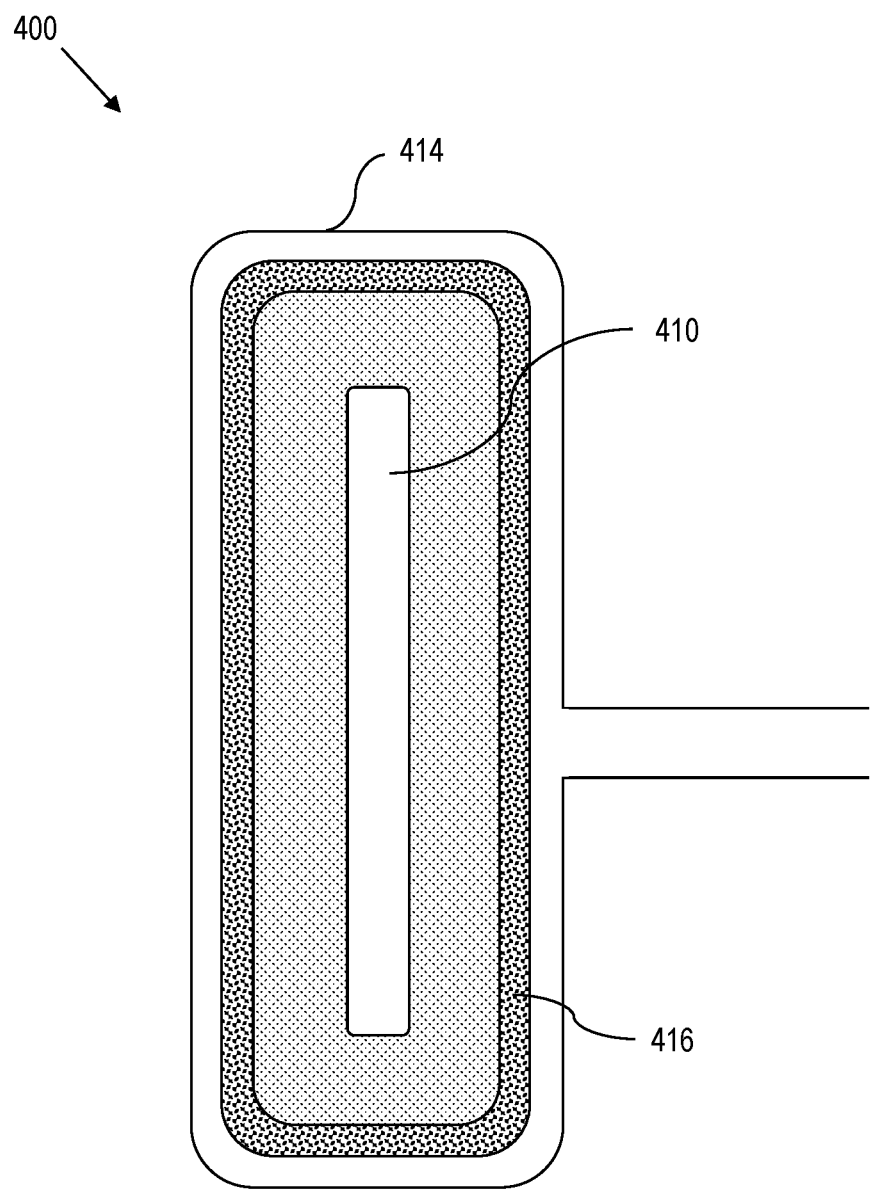
FIG. 4 is a diagram illustrating an alternative embodiment of the printhead for high-melting-point metals, according to various aspects of the present disclosure.

FIG. 4 illustrates an embodiment of a rectangular-shaped nozzle 410. The receptor tube 416 and filament 414 should match the shape of the nozzle 410. Other shapes of nozzles possible as well. The rectangular nozzle and other shaped nozzles may be used in any of the embodiments of the printhead (100, FIGS. 1 and 300, FIG. 3) described herein.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A printhead for heating metals, the printhead comprising:

a cap including:

a metal-material inlet; and a pressurized-gas inlet;

a material manifold for holding metal material fed through the metal-material inlet;

a material manifold shield that surrounds a portion of the material manifold;
a nozzle coupled to the material manifold;
a shield-gas inlet;
a refractory metal receptor tube that surrounds a portion of the nozzle;
an annular filament that surrounds the receptor tube and defines an electron beam zone at the receptor tube to melt the metal material in the manifold; and
a shield-gas manifold coupled to the shield-gas inlet, which supplies a shield-gas to the material as the melted material exits the nozzle.

2. The printhead of claim 1, wherein the pressurized-gas inlet includes a valve.

3. The printhead of claim 1, wherein the cap comprises stainless steel.

4. The printhead of claim 1, wherein the manifold is ceramic or stainless steel.

5. The printhead of claim 1, wherein the shield-gas and the pressure gas are argon.

6. The printhead of claim 1, wherein the shield-gas inlet is separate from the pressurized-gas inlet.

7. The printhead of claim 1, wherein the material manifold includes:
a hopper;
a throat; and
a funnel.

8. The printhead of claim 1, wherein the material manifold shield includes molybdenum.

9. The printhead of claim 1 further including a ceramic support that supports the material manifold shield.

10. The printhead of claim 1, wherein the annular filament is circular.

11. The printhead of claim 1, wherein:
the nozzle is rectangular; and
the annular filament is rectangular.

12. The printhead of claim 1, wherein the annular filament includes a gap.

13. The printhead of claim 1, wherein:
the annular filament is coupled to a negative terminal of a direct-current source; and
the receptor tube is coupled to a positive terminal of the direct-current source.

14. The printhead of claim 1 further including a copper, water-circulation tube for cooling the printhead.

15. The printhead of claim 1 further comprising multiple nozzles, where the nozzles are surrounded by the molybdenum filament.

16. The printhead of claim 1, where the refractory metal receptor tube is a molybdenum receptor tube.

17. The printhead of claim 1, wherein the refractory metal receptor tube is a tungsten receptor tube.

18. The printhead of claim 1 further comprising a vacuum opening for coupling to a system that draws a vacuum in the printhead.

* * * * *